United States Patent [19]

Eygelaar et al.

[11] Patent Number: 4,632,656
[45] Date of Patent: Dec. 30, 1986

[54] APPARATUS FOR THE MANUFACTURE OF MOLECULARLY ORIENTED PLASTIC PIPES

[75] Inventors: Klaas Eygelaar, Hoorn; Jaap Karreman; Peter Karreman, both of Enkhuizen, all of Netherlands

[73] Assignee: Draka Polva B.V., Amsterdam, Netherlands

[21] Appl. No.: 731,229

[22] Filed: May 7, 1985

[30] Foreign Application Priority Data

May 7, 1984 [FR] France .................. 84 07182

[51] Int. Cl.⁴ .................. B29C 49/08; B29C 55/22
[52] U.S. Cl. .................. 425/529; 425/387.1
[58] Field of Search .......... 425/387.1, 529, 526, 425/533, 532, 534, 535

[56] References Cited

U.S. PATENT DOCUMENTS

| | | | |
|---|---|---|---|
| 3,910,743 | 10/1975 | Farrell | 425/533 |
| 3,936,260 | 2/1976 | Farrell | 425/533 |
| 4,363,619 | 12/1982 | Farrell | 425/526 |
| 4,499,045 | 2/1985 | Obsomer | 425/387.1 |

FOREIGN PATENT DOCUMENTS 2510940 11/1983 France .

965381 7/1964 United Kingdom ........ 425/522

Primary Examiner—Willard E. Hoag
Attorney, Agent, or Firm—Spencer & Frank

[57] ABSTRACT

An apparatus for manufacturing molecularly oriented plastics pipes includes a tubular mould of transverse dimensions equal to those of the pipe to be produced and equipped with a device for admitting a fluid under pressure into a region intended to receive the pipe section to be expanded, a member for closing and grasping one end of the pipe section of a tubular sleeve which opens into the mould by an end away from the closing and grasping member and the transverse dimensions of which correspond to those of the pipe section and a means for causing a controlled relative axial displacement of the sleeve in relation to the closing and grasping member in which the open end of the sleeve is equipped with an annular plunger incorporating a surface of a frustoconical shape extending towards the inner wall of the mould and widened out in a direction away from the closing and grasping member.

The apparatus makes it possible to produce pipe sections which are molecularly oriented in a perfectly reproducible manner and which are especially suitable for the construction of pipelines for fluids under pressure.

6 Claims, 2 Drawing Figures

APPARATUS FOR THE MANUFACTURE OF MOLECULARLY ORIENTED PLASTIC PIPES

BACKGROUND OF THE INVENTION

The present invention relates to an improved apparatus which is suitable in particular for the manufacture of pipes made of plastic which is molecularly oriented by radial expansion by means of a fluid, from an unoriented plastic pipe section which is at a temperature at which drawing induces a molecular orientation.

A process and an apparatus which are suitable in particular for producing molecularly oriented plastic pipes according to this drawing technique are already the subject of Patent Application No. FR-A-92,510,940 in the name of SOLVAY & Co.

According to this process, a pipe section is placed in a mould, radial expansion is produced of the pipe section which is heated to a temperature at which drawing induces molecular orientation of the plastic by means of a fluid which is introduced under pressure into the pipe section after the latter has been closed at both of its ends, the resulting pipe is cooled and extracted from the mould, the said process being characterised in that the pipe section is clamped in a sleeve and a relative displacement of the sleeve along the pipe section is produced while fluid is being introduced therein, so as to cause radial expansion of the pipe section downstream of the sleeve. In this process, the start of the radial expansion of the pipe section to be oriented always takes place at one end and the expansion bubble formed extends gradually along the pipe section, this progression being controlled by the relative displacement of the sleeve. This process makes it possible to produce oriented pipes the radial orientation of which is perfectly controlled even for pipes of great length.

The apparatus which can be employed to implement this process incorporates a tubular mould the transverse dimensions of which correspond to those of the pipe to be produced and which is fitted with a device for admitting a pressurized fluid into a zone of the mould which is intended to receive the pipe section to be expanded radially, a member for closing and grasping one end of the pipe section in the mould, a tubular sleeve which opens into the mould by an open end facing the closing and grasping member and which has transverse dimensions corresponding to those of the pipe section which it is intended to receive, and means for causing a controlled relative axial displacement of the sleeve in relation to the closing and grasping member, for moving them apart and for extracting the pipe section from the sleeve and which is characterised in that the open end of the sleeve is fitted with an annular plunger mounted so as to slide in the mould.

According to the abovementioned patent application, the annular plunger has an annular surface arranged at the exit of the sleeve and extending towards the inner wall of the mould, of a generally frustoconical shape and widened out in the direction of the closing and grasping member, the conicity angle being between 15° and 75°.

It has been found, however, that when such a plunger is used in the apparatus described above the degree of longitudinal orientation of the molecularly oriented pipes which are produced is not sufficiently reproducible and controllable. Moreover, it has been found that the molecularly oriented pipes produced can exhibit irregularities in wall thickness.

SUMMARY OF THE INVENTION

It has now been found that it is possible, using the apparatus described above and by means of a modification in the shape of the plunger, to produce molecularly oriented pipes in which the degree of longitudinal drawing and hence of longitudinal molecular orientation can be controlled in a highly accurate and perfectly reproducible manner, the pipes thus produced furthermore being characterised by very high uniformity of wall thickness.

The present invention consequently relates to an apparatus for the manufacture of molecularly oriented plastic pipes by radial expansion of a pipe section, comprising a tubular mould the transverse dimensions of which correspond to those of the pipe to be produced and which is equipped with a device for admitting a fluid under pressure into a region of the mould which is intended to receive the pipe section to be radially expanded, a member for closing and grasping one end of the pipe section in the mould, a tubular sleeve which opens into the mould by an open end facing the closing and grasping member and which has transverse dimensions corresponding to those of the pipe section to be oriented and which it is intended to receive, and a means for producing a controlled relative axial displacement of the sleeve in relation to the closing and grasping member, for moving them apart and for extracting the pipe section from the sleeve in which the open end of the sleeve is equipped with an annular plunger mounted so as to slide in the mould and incorporating a surface arranged at the exit of the sleeve extending towards the inner wall of the mould and generally frustoconical in shape, which is characterised in that the said surface is widened out in the direction away from the closing and grasping member.

It has been found, in effect, that the fact that the direction of the conicity of the plunger surface is reversed makes it possible, contrary to all expectations, to produce molecularly oriented pipes in which the degree of orientation in the longitudinal direction is perfectly reproducible.

According to a preferred embodiment, the angle of conicity of the frustoconical surface of the plunger is between 1° and 89° and, preferably, between 30° and 80°.

The surface which is generally of a frustoconical shape can also consist of a superposition of a plurality of frustoconical surfaces having different conicity angles.

According to an embodiment which is also found to be highly advantageous, the frustoconical surface is joined to the wall of the plunger which slides over the pipe via a round-off the radius of curvature of which is between 0.1 and 20 mm and preferably between 0.5 and 10 mm.

It has further been found that the apparatus according to the invention can assume all the alternative forms of embodiment proposed in the abovementioned French patent application, provided that the plunger has the abovementioned characteristics.

The apparatus according to the invention is furthermore clarified in greater detail in the following description of a practical embodiment.

DESCRIPTION OF THE PREFERRED EMBODIMENT

Figure 1:
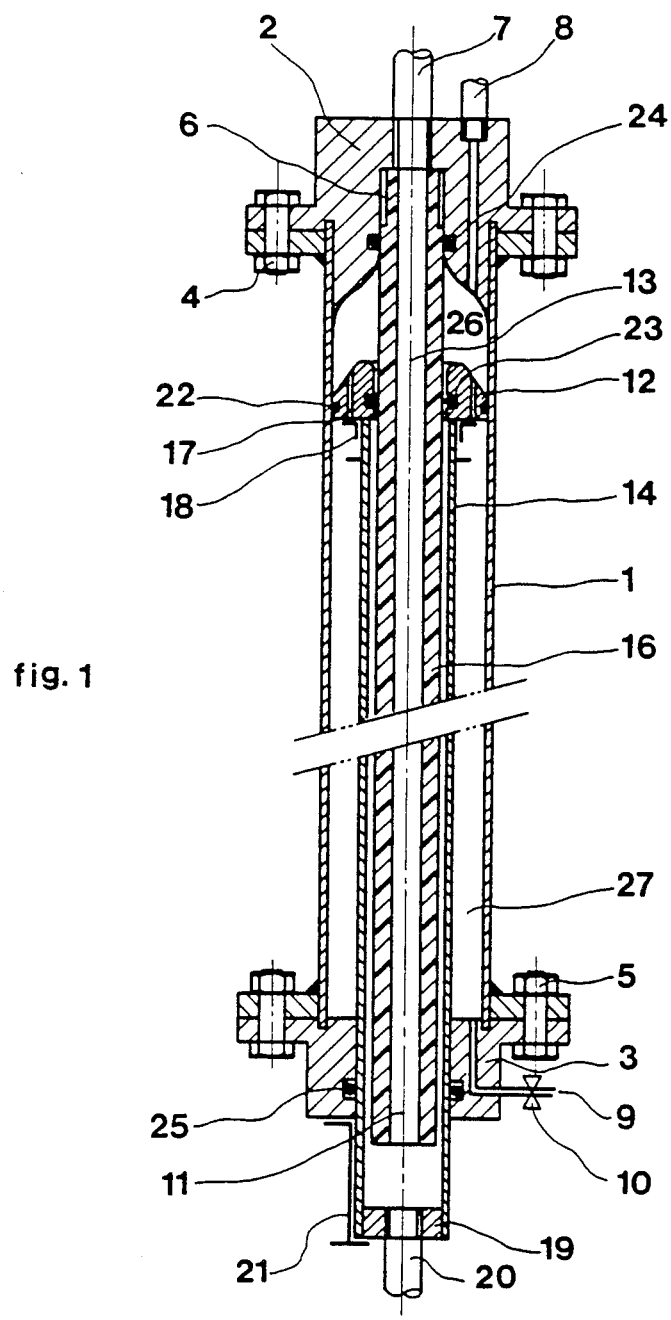
FIG. 1 is a sectional view of an apparatus according to the invention in its position before the expansion of the pipe section.
Figure 2:
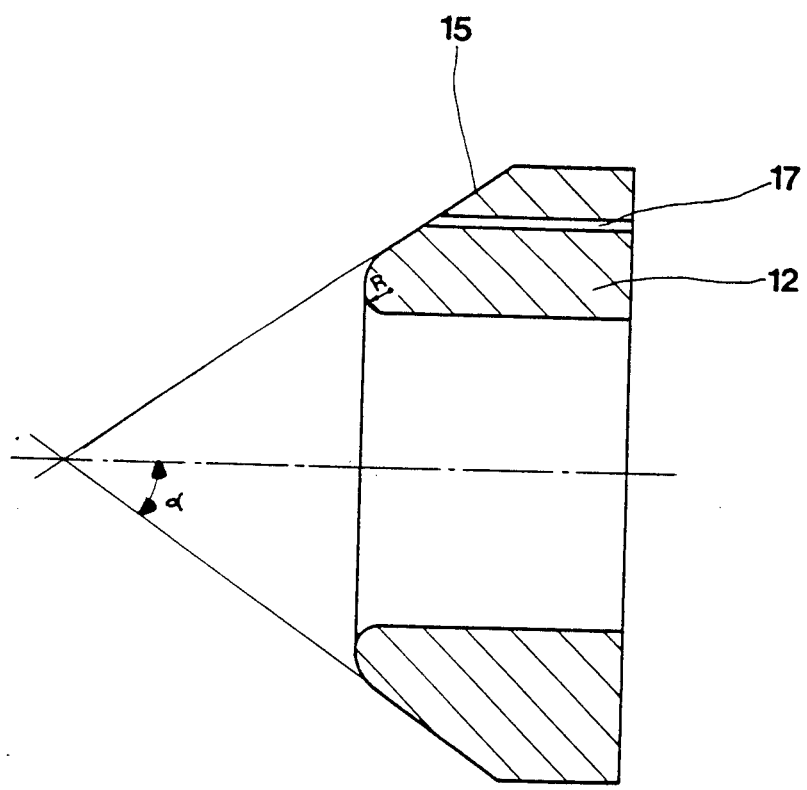
FIG. 2 is an enlarged sectional view of the plunger fitted to the apparatus of FIG. 1.

As can be seen in FIGS. 1 and 2, the apparatus according to the invention incorporates a mould consisting externally of a tubular casing 1 flanged at its ends and of 2 covers 2,3 fixed detachably by nuts 4, 5 to the flanges of the tubular casing 1.

The internal diameter of the tubular casing 1 corresponds to the external diameter of the oriented pipe section which it is intended to produce.

The first cover 2 incorporates a closing and grasping member 6 consisting of a central threaded internal housing to fix and hold therein a pipe section 16 which is to be oriented, an axial pipe 7 opening out into the housing and a side pipe 8 opening outside the housing and into the tubular casing 1.

The second cover 3 is provided with a peripheral pipe 9 opening into the mould and equipped with an adjustable valve 10, and it incorporates a central opening 11.

The apparatus further incorporates a tubular sleeve 14 arranged axially in the casing 1 and fixed, at one end, to an annular plunger 12 which can slide axially in the casing 1. The circular central opening 13 in the plunger 12 and the inner diameter of the sleeve 14 correspond substantially to the external diameter of the pipe section 16 to be molecularly oriented by radial expansion. The plunger 12 is furthermore pierced by longitudinal pipes 17 which are equipped with non-return flap valves 18 on the rear face of the plunger.

The annular plunger 12 incorporates a surface 15 arranged at the exit of the sleeve 14 extending towards the inner wall of the mould 1 and generally frustroconical in shape. According to the invention the said surface is widened out in a direction away from the closing and grasping member 6.

As can be seen more particularly in FIG. 2, the conicity angle alpha of the frustoconical surface 15 is equal to 37° and the frustoconical surface is joined to the wall of the plunger 12 which slides over the pipe 16 via a round-off the radius of curvature R of which is equal to 6 mm.

The sleeve 14 is mounted so as to slide in the central opening 11 provided in the cover 3, which thus forms a second plunger, fixed integrally into the casing 1 of the mould. The length of the sleeve 14 is such that the latter emerges through this central opening 11 when the plunger 12 is close to the cover 2. The end of the sleeve 14 away from the plunger 12 is equipped with a closing plug 19 provided with a pipe 20 equipped with a valve which is not shown, so as to form a stopper for the pipe section 16.

Ring seals 22 and 25 respectively provide leak-proof sealing between the plunger 12 and the casing 1 and between the cover 3 and the sleeve 14, so as to define an annular chamber 27 of variable volume. Ring seals 23 and 24 are also provided to provide leakproof fixing of the pipe section 16 to the cover 2 and its leakproof passage through the opening 13 in the plunger 12. The cover is furthermore equipped with a bolt 21 which enables the sleeve 14 to be locked when the plunger 12 is close to the cover 2.

To make use of the apparatus in FIGS. 1 and 2 with a view to producing an oriented pipe, the cover 2 of the tubular casing 1 should be removed and the end of a plastic pipe section 16 should be fixed, for example by screwing, in the closing and grasping member 6. The pipe section is then introduced by its other end into the apparatus so that it passes through the plunger 12 is housed in the sleeve 14. The cover 2 is then fixed again onto the casing 1 and the plunger 12 is brought into the position shown in FIG. 1 and locked in place by means of the bolt 21 acting on the end of the sleeve 14. The pipe section 16 which is thus enclosed in the apparatus is then brought up to the temperature for orientation of the plastic by circulating a fluid such as oil at an appropriate temperature. This fluid is introduced via pipes 7 and 8, circulates inside the pipe section 16 and in the annular chamber 27 via, in particular, pipes 17 and is recovered via pipes 9 and 20. When the pipe section 16 has reached its orientation temperature, circulation of the heat transfer fluid is stopped, the valve 10 in pipe 9 is closed and the pipe 8 is opened to the atmosphere to purge the chamber 26 of its fluid. It should be noted that, on the other hand, the fluid remains trapped in the space 27 because the flap valves 18 prevent its outflow via the pipes 17.

To initiate the expansion of the pipe section 16 it is then necessary to unlock the bolt 21 and to increase the pressure of the fluid introduced into the pipe section 16 via the pipe 7, the discharge valve (not illustrated) for pipe 20 being closed. As a result, the part of the pipe section which is in the chamber 26 situated downstream of the sleeve 14 and of the plunger 12 expands radially and comes to bear on the outer outline of this chamber 26, while the remaining part of the pipe section 16 is held laterally by the sleeve 14 and is not distorted. Furthermore, during this initial radial expansion of the pipe section, the plunger 12 cannot move because it is blocked by the fluid enclosed in the chamber 27. To produce and control the progress of expansion along the pipe section 16, it then suffices to open the valve 10 in a predetermined manner so as gradually to discharge the fluid enclosed in the chamber 27. The plunger 12 and the sleeve 14 can consequently move gradually towards the cover 3 at a predetermined speed, under the effect of the fluid injected via the pipe 7, thus permitting a gradual expansion of the whole pipe section 16 as far as the diameter of the tubular casing 1.

The displacement of the piston 12 and of the sleeve 14 is damped by the controlled escape, via pipe 9 and valve 10, of the fluid present in the chamber 27, which makes it possible to control the rate of displacement at the chosen value, for example between approximately 0.1 and 10 m/min. When the plunger 12 reaches the cover 3, the process of expansion of the pipe section 16 is terminated and the injection of the fluid under pressure is stopped. The expansion fluid can then be gradually replaced by a cold fluid under pressure so as to cool the expanded pipe section 16 while its shape is maintained. The molecularly oriented pipe can then be extracted from the apparatus.

It is found that, using the apparatus described, it is possible to produce molecularly oriented pipe sections the degree of both radial and longitudinal orientation of which can be controlled with great accuracy. The pipes produced are characterised by a remarkably uniform wall thickness and are especially suitable for the construction of pipelines intended to convey liquid or gaseous fluids under pressure.

We claim:

1. Apparatus for the manufacture of molecularly oriented plastic pipes by radial expansion of a pipe section, comprising a tubular mould the transverse dimensions of which correspond to those of the pipe to be produced and which is equipped with a device for admitting a fluid under pressure into a region of the mould intended to receive the pipe section to be radially expanded, a member for closing and grasping one end of the pipe section in the mould, a tubular sleeve which opens into the mould by an open end facing the closing and grasping member and which has transverse dimensions corresponding to those of the pipe section which it is intended to receive and a means for producing a controlled relative axial displacement of the sleeve in relation to the closing and grasping member, for moving them and for gradually extracting the pipe section from the sleeve and in which the open end of the sleeve is equipped with an annular plunger mounted so as to slide in the mould and incorporating a surface arranged at the exit of the sleeve extending towards the inner wall of the mould and generally frustoconical in shape, characterised in that the said surface is widened out in a direction away from the closing and grasping member.

2. Apparatus according to claim 1, characterised in that the conicity angle alpha of the frustoconical surface of the plunger is between 1° and 89°.

3. Apparatus according to claim 1, characterised in that the frustoconical surface consists of a superposition of a plurality of frustoconical surfaces having different conicity angles.

4. Apparatus according to claim 1, characterised in that the frustoconical surface is joined to the wall of the piston which slides over the pipe via a round-off the radius of curvature of which is between 0.1 and 20 mm.

5. Apparatus according to claim 2, characterised in that the frustoconical surface is joined to the wall of the piston which slides over the pipe via a round-off the radius of curvature of which is between 0.1 and 20 mm.

6. Apparatus according to claim 3, characterised in that the frustoconical surface is joined to the wall of the piston which slides over the pipe via a round-off the radius of curvature of which is between 0.1 and 20 mm.

* * * * *